United States Patent
Lee et al.

(10) Patent No.: US 8,541,972 B2
(45) Date of Patent: Sep. 24, 2013

(54) METHOD FOR SUPPRESSING SPEED RIPPLE BY USING TORQUE COMPENSATOR BASED ON ACTIVATION FUNCTION

(75) Inventors: Dong Hee Lee, Busan (KR); Jin Woo Ahn, Busan (KR)

(73) Assignee: Kyungsung University Industry Cooperation Foundation, Busan (KR)

( * ) Notice: Subject to any disclaimer, the term of this patent is extended or adjusted under 35 U.S.C. 154(b) by 110 days.

(21) Appl. No.: 13/315,245

(22) Filed: Dec. 8, 2011

(65) Prior Publication Data

US 2013/0113408 A1 May 9, 2013

(30) Foreign Application Priority Data

Nov. 4, 2011 (KR) .................. 10-2011-0114735

(51) Int. Cl.
*G05D 23/275* (2006.01)
(52) U.S. Cl.
USPC ...... 318/632; 318/609; 318/432; 318/400.24; 318/807; 363/126; 363/132; 363/35; 363/65; 477/8; 701/93; 701/96; 701/67; 702/191; 702/57; 702/69; 702/85; 180/65.225; 180/65.29; 474/110; 474/101; 474/103; 474/112; 123/588; 123/585; 388/805; 388/902; 388/906
(58) Field of Classification Search
USPC .............. 318/632, 494, 807, 609, 661, 727, 318/723, 701, 700, 720, 254.1, 400.13, 6, 318/400.23, 400.04, 400.05, 400.42, 825; 474/110, 101, 103, 112; 363/126, 132, 35, 363/65; 180/65.225, 65.29; 702/191, 57, 702/69, 85; 701/93, 96, 67; 477/8
See application file for complete search history.

(56) References Cited

U.S. PATENT DOCUMENTS

| 4,862,851 | A | * | 9/1989 | Washino et al. | ......... 123/339.11 |
|---|---|---|---|---|---|
| 5,355,060 | A | * | 10/1994 | Peterson | ..................... 318/432 |
| 5,737,483 | A | * | 4/1998 | Inaji et al. | ..................... 388/805 |
| 7,224,141 | B2 | * | 5/2007 | Ide | ................................ 318/807 |
| 7,733,047 | B2 | * | 6/2010 | Ikeda et al. | .................. 318/432 |
| 8,169,172 | B2 | * | 5/2012 | Markunas et al. | ....... 318/400.24 |

FOREIGN PATENT DOCUMENTS

| KR | 1019990084680 A | 12/1999 |
|---|---|---|
| KR | 1020110014874 A | 2/2011 |
| KR | 1020110094946 A | 8/2011 |

* cited by examiner

*Primary Examiner* — Eduardo Colon Santana
*Assistant Examiner* — Jorge Carrasquillo
(74) *Attorney, Agent, or Firm* — Novick, Kim & Lee, PLLC; Jae Youn Kim

(57) ABSTRACT

Disclosed is a method for suppressing a speed ripple occurring during an operation of an AC motor by using a torque compensator based on an activation function. The method includes the steps of calculating a speed error $\omega_{err}$ based on a reference speed $\omega_{ref}$ and an actual speed $\omega_{act}$; calculating a controller output $T_{rm}$ by using the speed error $\omega_{err}$ as an input of a PI control and an operation of a compensated torque $T_{com}$; and determining a torque variation based on the controller output $T_{rm}$ and a reference torque $T_{ref}$ and operating the torque variation in relation to an anti-windup gain $K_a$ to use torque variation as an input of an integral (I) control. The method suppresses the speed ripple by compensating for the torque ripple through a controller which calculates the compensated torque by taking the signs of the speed error and the differential speed error into consideration.

3 Claims, 22 Drawing Sheets

METHOD FOR SUPPRESSING SPEED RIPPLE BY USING TORQUE COMPENSATOR BASED ON ACTIVATION FUNCTION

BACKGROUND

The present invention relates to a method for suppressing a speed ripple by using a torque compensator based on an activation function. More particularly, the present invention relates to a speed control technology for a motor, in which a torque is compensated and a speed ripple is suppressed based on a speed error of a speed ripple when the speed ripple is generated due to periodic torque ripples synchronized with the angular frequency caused by the measurement error of current, the dead-time, the cogging torque, and variation of the load torque in the motor.

In general, a permanent magnet synchronous motor (PMSM) has the simple structure, high efficiency, high power output and low cost, so the PMSM has been extensively used in various industrial fields, such as robots and household electric appliances.

A proportional controller, a proportional-integral (PI) controller, and a proportional-integral-derivative (PID) controller are used to control the PMSM control system in such a manner that the PMSM control system can be operated according to external commands. The above controllers detect the output of an object to be controlled to allow the object to rapidly follow the command values.

The PID controller according to the related art has performed the control operation through three schemes of 1) limited integrator scheme, 2) conditional integration scheme and 3) tracking back calculation scheme.

For instance, the PID controller performs the feedback control through the PID control until the present RPM of a BLDC motor reaches the target RPM.

FIGS. 1 and 2 are block diagrams showing the structure of the PID controller according to the related art, in which FIG. 1 shows the structure of a general PID speed controller and FIG. 2 shows the structure of a general anti-windup PID speed controller.

That is, as shown in FIG. 1, the PID control is a feedback control to maintain the output to the level of reference voltage based on the error between the control parameter and reference input. The P (proportional) control makes a control signal by multiplying the proper proportional constant gain by the speed error $\omega_{err}$ between the reference speed $\omega_{ref}$ and the actual speed $\omega_{act}$, the I (proportional integral) control is achieved by parallel connecting the integral control, which makes the control signal by integrating the error signals, to the proportional control, and the D (proportional derivative) control is achieved by parallel connecting the derivative control, which makes the control signal by differentiating the error signals, to the proportional control.

Meanwhile, Korean Unexamined Patent Publication No. 2011-0094946 (publication date: Aug. 24, 2011) discloses a PID controller including a driver operating in a linear region or a saturate region, a proportional controller performing a proportional operation with respect to the error between a reference value and an output value of a plant, a differential controller performing a differential operation with respect to the error, an integral controller performing an integral operation with respect to the error when the driver is operated in the linear region, an integral state predictor predicting the integral state under the normal sate of the integral controller, and an integral state initializing loop allowing the initial state of the integral controller to have the integral state value of the linear region before the driver enters the linear region by using the integral state under the normal state of the integral controller.

In addition, Korean Unexamined Patent Publication No. 1999-0084680 (publication date: Dec. 6, 1999) discloses an anti-windup PID controller, which removes the accumulated errors when the value of the accumulated errors deviates from the reference range as the integral values of a proportional integral controller are accumulated, thereby precisely controlling air pressure within a predetermined range and constantly maintaining air flux in a clean room.

Further, Korean Unexamined Patent Publication No. 2011-0014874 (publication date: Feb. 14, 2011) discloses a control system for a permanent magnet synchronous motor, which includes a position estimation part for estimating a position of a rotor of a motor, a current measurement part for measuring current according to voltage applied to the motor, a position error calculation part for calculating a position error between an actual rotor position and an estimated rotor position by using the measured current, and a position correction part for correcting the position of the rotor by using the calculated position error.

However, the above conventional technologies fail to disclose the torque compensation and the suppression of the speed ripple.

SUMMARY

The present invention has been made to solve the problems occurring in the prior art, and an object of the present invention is to provide a method for suppressing a speed ripple, which calculates an activation function for operating a torque compensator by taking into consideration a sign of a speed error and a sign of a speed error differential term, and combines a torque compensation value derived from the speed error and the speed error differential term with the activation function to suppress the speed ripple.

In order to accomplish the above object, according to one embodiment of the present invention, there is provided a method for suppressing a speed ripple occurring during an operation of an AC motor by using a torque compensator based on an activation function. The method includes the steps of (a) calculating a speed error $\omega_{err}$ based on a reference speed $\omega_{ref}$ and an actual speed $\omega_{act}$; (b) calculating a controller output $T_{rm}$ by using the speed error $\omega_{err}$ as an input of a PI control and an operation of a compensated torque $T_{com}$; and (c) determining a torque variation based on the controller output $T_{rm}$ and a reference torque $T_{ref}$ and operating the torque variation in relation to an anti-windup gain $K_a$ to use torque variation as an input of an integral (I) control.

According to the exemplary embodiment of the present invention, in step (b), an output of the compensated torque $T_{com}$ is determined based on $$f\left(\omega_{err} \cdot \frac{d\omega_{err}}{dt}\right) = 0$$

$$\left(\text{when,} \left(\omega_{err} \cdot \frac{d\omega_{err}}{dt}\right) < 0\right)$$

and $$f\left(\omega_{err} \cdot \frac{d\omega_{err}}{dt}\right) = 1$$

$$\left(\text{when,} \left(\omega_{err} \cdot \frac{d\omega_{err}}{dt}\right) > 0\right)$$

According to the exemplary embodiment of the present invention, in step (b), the compensated torque $T_{com}$ is determined based on $T_{com} = f(\chi) \cdot K_c \cdot \omega_{err}$, in which $K_c$ is a compensator gain.

According to the exemplary embodiment of the present invention, in step (c), an output of the compensated torque is determined based on a sign of the speed error and a sign of a differential speed error.

As described above, according to the method for suppressing the speed ripple by using the torque compensator based on the activation function of the present invention, the torque ripple is compensated through the controller, which calculates a compensated torque by taking the signs of the speed error and differential speed error into consideration, thereby suppressing the speed ripple.

DETAILED DESCRIPTION OF THE EMBODIMENTS

The above and other objects and features of the present invention will be more clearly comprehended through the following description and accompanying drawings.

Hereinafter, exemplary embodiments of the present invention will be described with reference to accompanying drawings.

First, the compensated torque employed in the present invention will be described with reference to FIGS. 3a to 3c.

Figure 1:
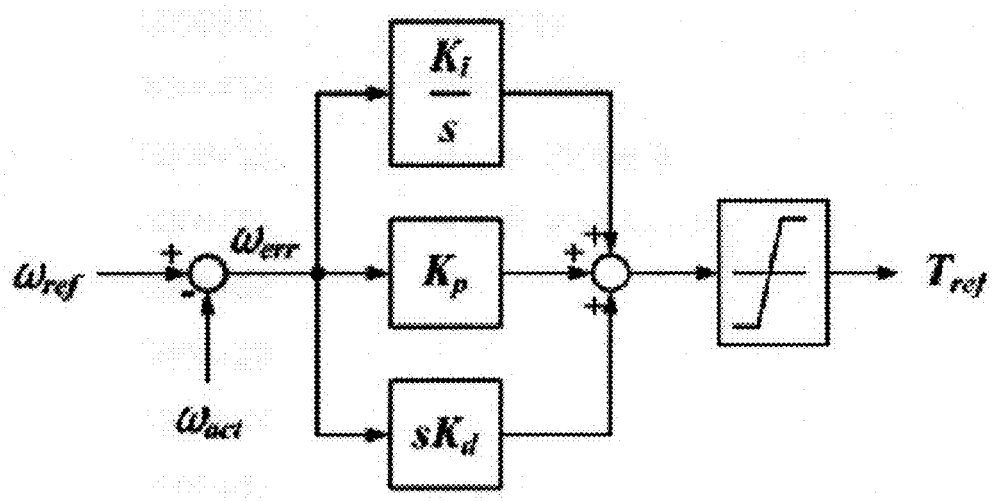
FIG. 1 is a block diagram showing the structure of a PID speed controller according to the related art.
Figure 2:
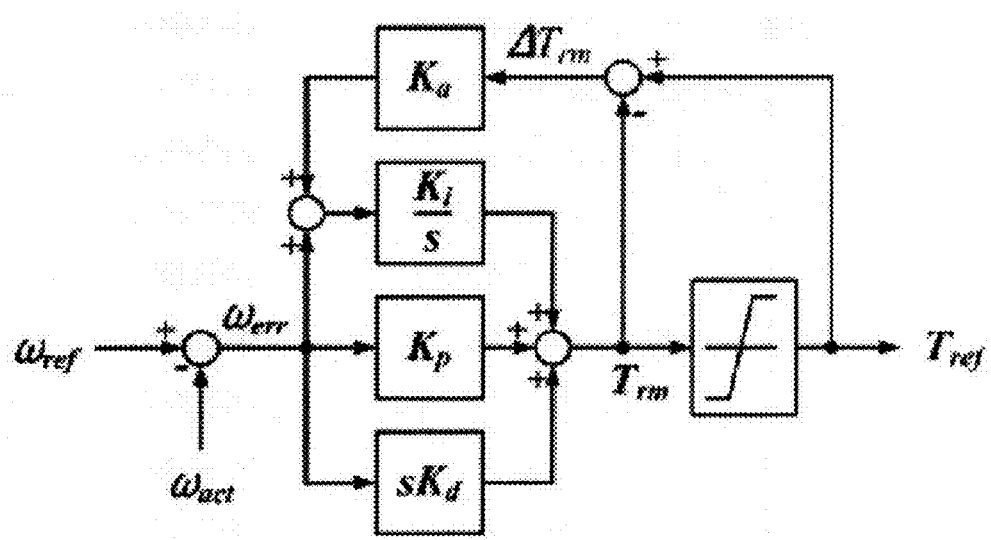
FIG. 2 is a block diagram showing the structure of an anti-windup PID speed controller according to the related art.
Figure 3A:
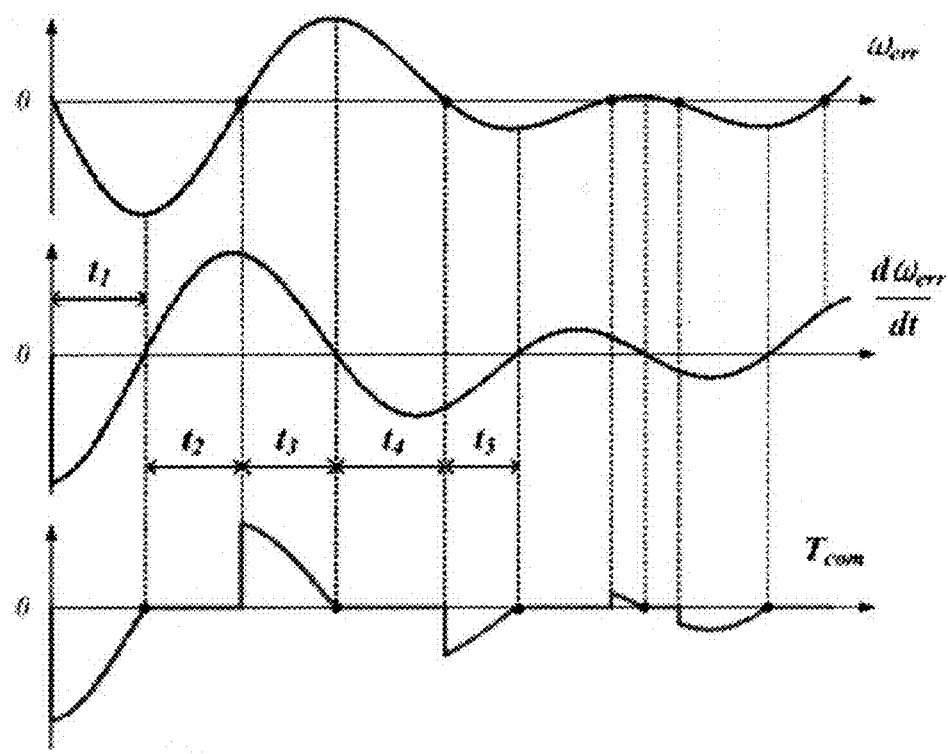
FIG. 3a is a graph showing an output of a compensated torque $T_{com}$ according to one embodiment of the present invention.
Figure 3B:
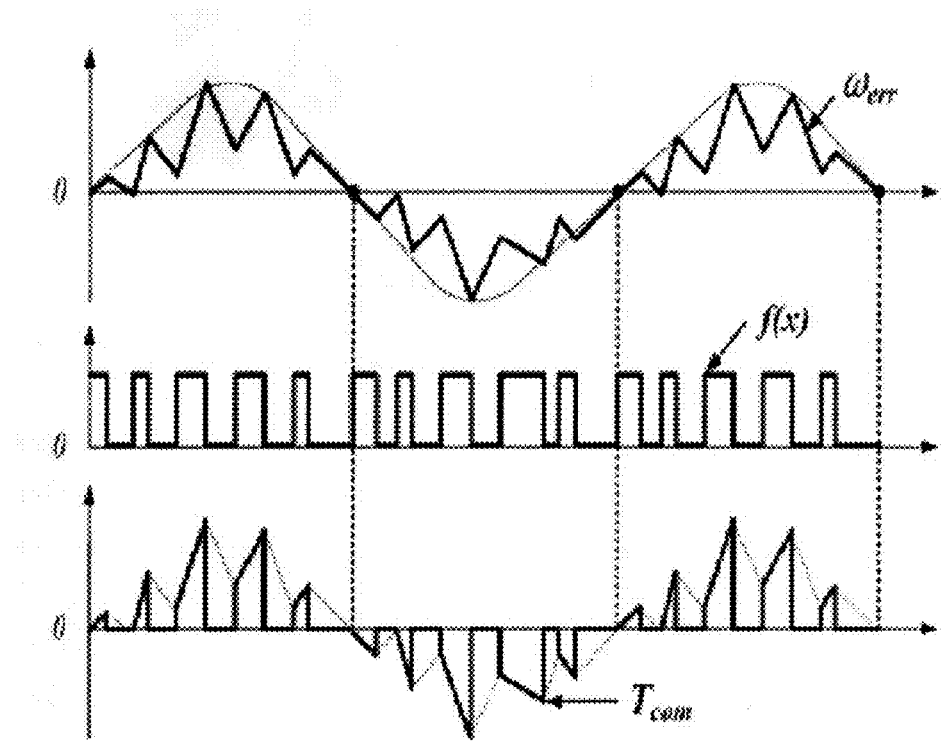
FIG. 3b is a graph showing an output of a compensated torque $T_{com}$ according to another embodiment of the present invention.
Figure 3C:
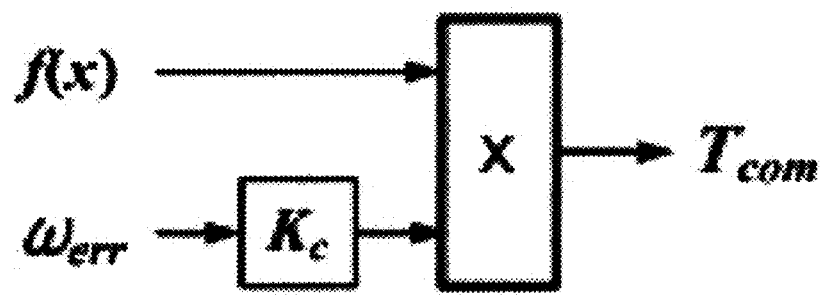
FIG. 3c is a block diagram showing the structure of a torque compensator according to the present invention.

FIG. 3a is a graph showing an output of a compensated torque $T_{com}$ according to one embodiment of the present invention, FIG. 3b is a graph showing an output of a compensated torque $T_{com}$ according to another embodiment of the present invention, and FIG. 3c is a block diagram showing the output structure of a compensated torque $T_{com}$ according to the present invention.

As shown in FIG. 3a, a speed error $\omega_{err}$ can be achieved based on a reference speed $\omega_{ref}$ and an actual speed $\omega_{act}$, as shown in equation 1

$$\omega_{err} = \omega_{ref} - \omega_{act} \quad \text{[Equation 1]}$$

The first graph shows the speed error $\omega_{err}$ fluctuated in the '+' direction and '−' direction about the X-axis representing time and the second graph shows the differential of the speed error $\omega_{err}$ as a function of time, and the third graph shows the output of the compensated torque $T_{com}$ based on the above two graphs.

The X-axis representing the time is divided into $t_1$ to $t_5$ sections according to the maximum value and the minimum value of the speed error $\omega_{err}$ and the cross point of the speed error $\omega_{err}$ with respect to the X-axis. The speed error $\omega_{err}$ is integrated with respect to each time section.

Hereinafter, the structure of a speed controller having an activation function according to the embodiment of the present invention will be described with reference to FIGS. 4a and 4b.

Figure 4A:
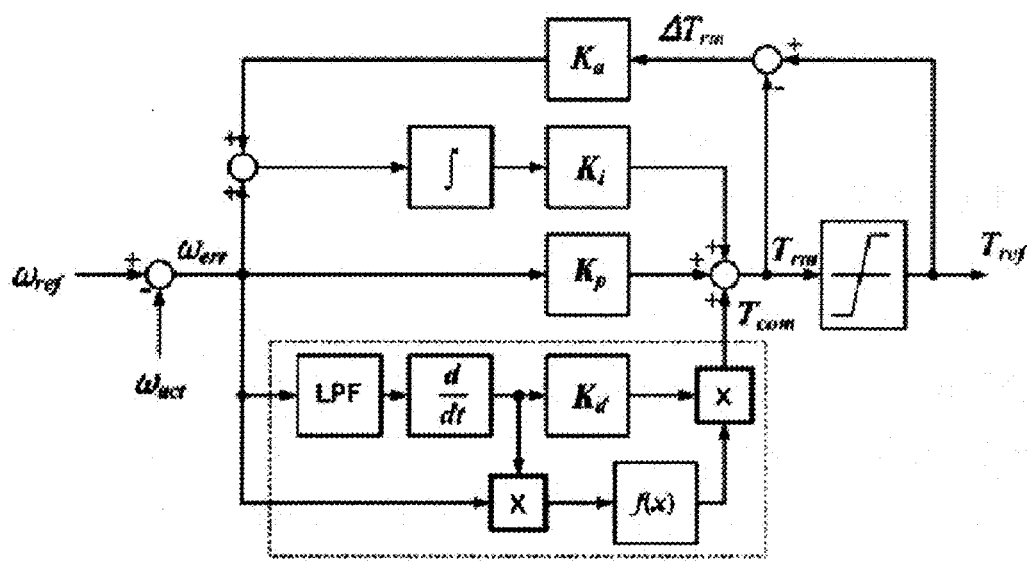
FIG. 4a is a block diagram showing the structure of a speed controller having an activation function according to one embodiment of the present invention.
Figure 4B:
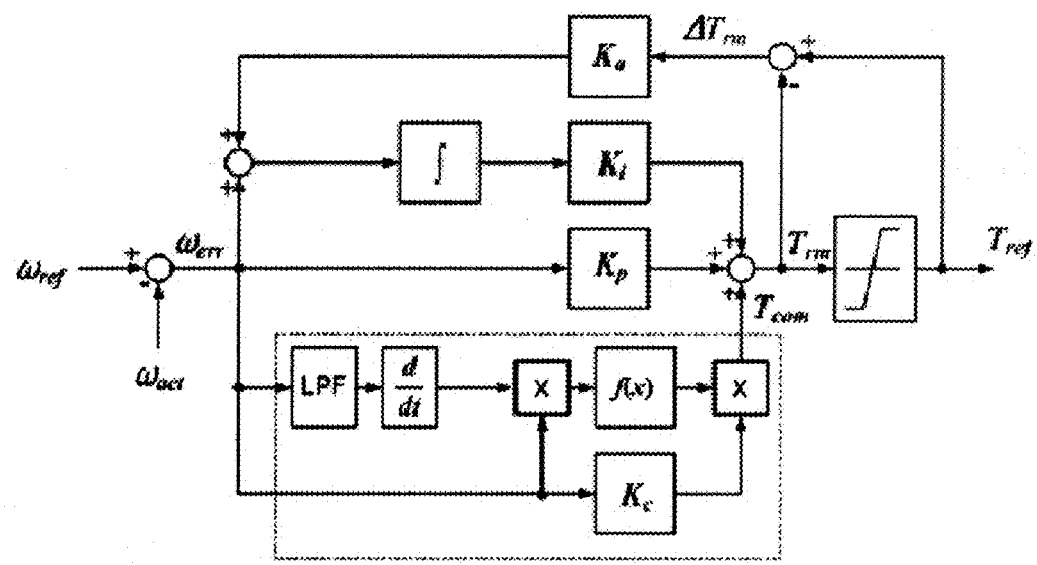
FIG. 4b is a block diagram showing the structure of a speed controller having an activation function according to another embodiment of the present invention.

FIG. 4a is a block diagram showing the structure of a modified PID speed controller according to one embodiment of the present invention and FIG. 4b is a block diagram showing the structure of a speed controller having an activation function according to another embodiment of the present invention.

As shown in FIG. 4a, the speed controller according to the present invention includes a PID controller having an anti-windup function and properly limits the internal value of an integrator according to the output limit value. The torque variation $\Delta T_{rm}$ is shown in equation 2.

$$\Delta T_{rm} = T_{ref} - T_{act} \quad \text{[Equation 2]}$$

As shown in FIGS. 3a and 4a, the controller output $T_{rm}$ and the compensated torque $T_{com}$ can be expressed as equation 3.

$$T_{rm} = K_p \cdot \omega_{err} + \frac{K_i}{s} \cdot (\omega_{err} + K_a \cdot \Delta T_{rm}) + T_{com} \quad \text{[Equation 3]}$$

$$T_{com} = f\left(\omega_{err} \cdot \frac{d\omega_{err}}{dt}\right) \cdot K_d \cdot \frac{d\omega_{err}}{dt}$$

The activation function is represented as equations 4 and 5 according to the sign of a multiply between the speed error $\omega_{err}$ and the integrated speed error.

$$\left(\omega_{err} \cdot \frac{d\omega_{err}}{dt}\right) < 0, \; f\left(\omega_{err} \cdot \frac{d\omega_{err}}{dt}\right) = 0 \qquad \text{[Equation 4]}$$

$$\left(\omega_{err} \cdot \frac{d\omega_{err}}{dt}\right) > 0, \; f\left(\omega_{err} \cdot \frac{d\omega_{err}}{dt}\right) = 1 \qquad \text{[Equation 5]}$$

If the activation function is determined according to equations 4 and 5, the output of the compensated torque $T_{com}$ can be simply calculated based on the sign of the multiply between the speed error $\omega_{err}$ and the speed error which is integrated after passing through the low band pass filter. The intensity of the output may be determined depending on the integrated speed error and the differential controller gain.

As shown in equations 4 and 5 and FIGS. 3b and 3c, the output of the compensated torque $T_{com}$ can be determined according to the positive (+) direction and the negative (−) direction about the X-axis representing time by taking into consideration the maximum value and the minimum value of the speed error $\omega_{err}$ and the cross point of the speed error $\omega_{err}$ with respect to the X-axis.

As shown in FIG. 4b, the speed error which is integrated after passing through the low band pass filter is used only for calculating the output of the compensated torque $T_{com}$.

According to the output structure of the compensated torque $T_{com}$ shown in FIG. 3c, the compensated torque $T_{com}$ can be simply calculated based on the speed error $\omega_{err}$, the compensator gain $K_c$ of the torque compensator according to the present invention, and the output of the compensated torque $T_{com}$ determined based on equations 4 and 5 as expressed in equation 6.

$$T_{com} = f(\chi) \cdot K_c \cdot \omega_{err} \qquad \text{[Equation 6]}$$

Hereinafter, the simulation results of the present invention will be described in comparison with the simulation results of the related art.

Figure 5A:
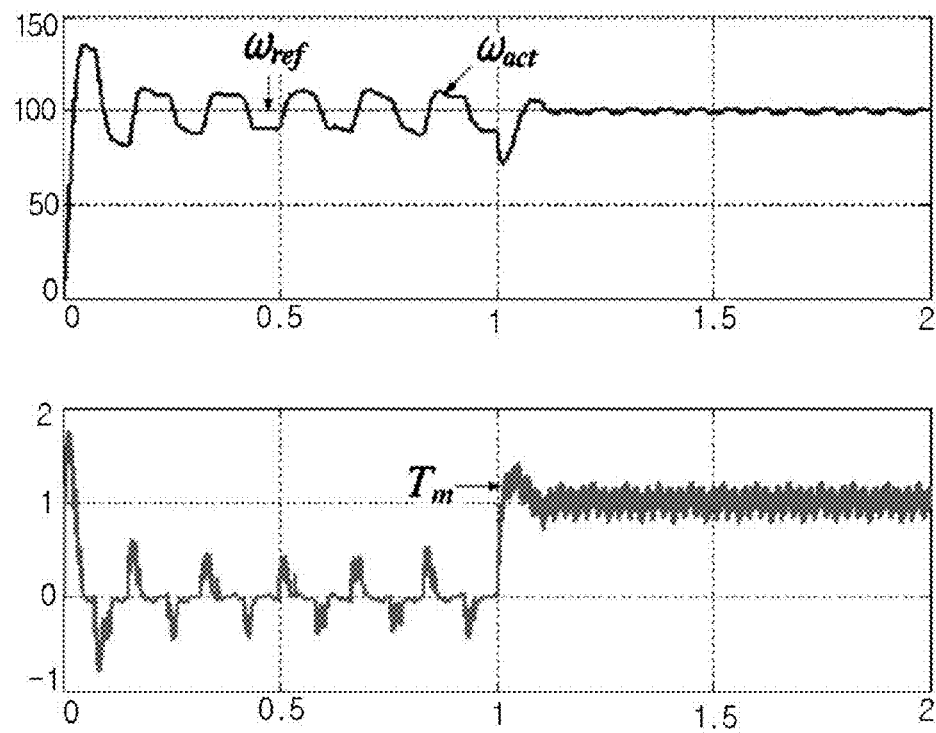
FIGS. 5a and 5b are graphs showing the simulation result of a PI speed controller at 500[rpm]
Figure 5B:
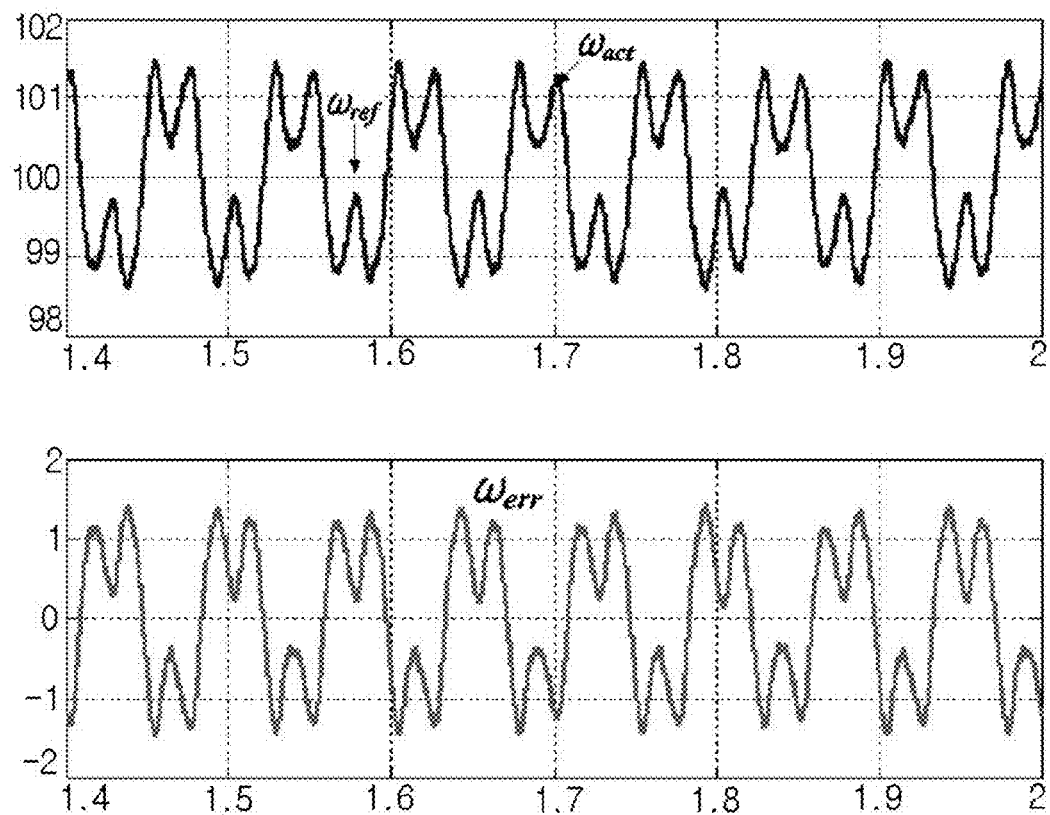
Figure 6A:
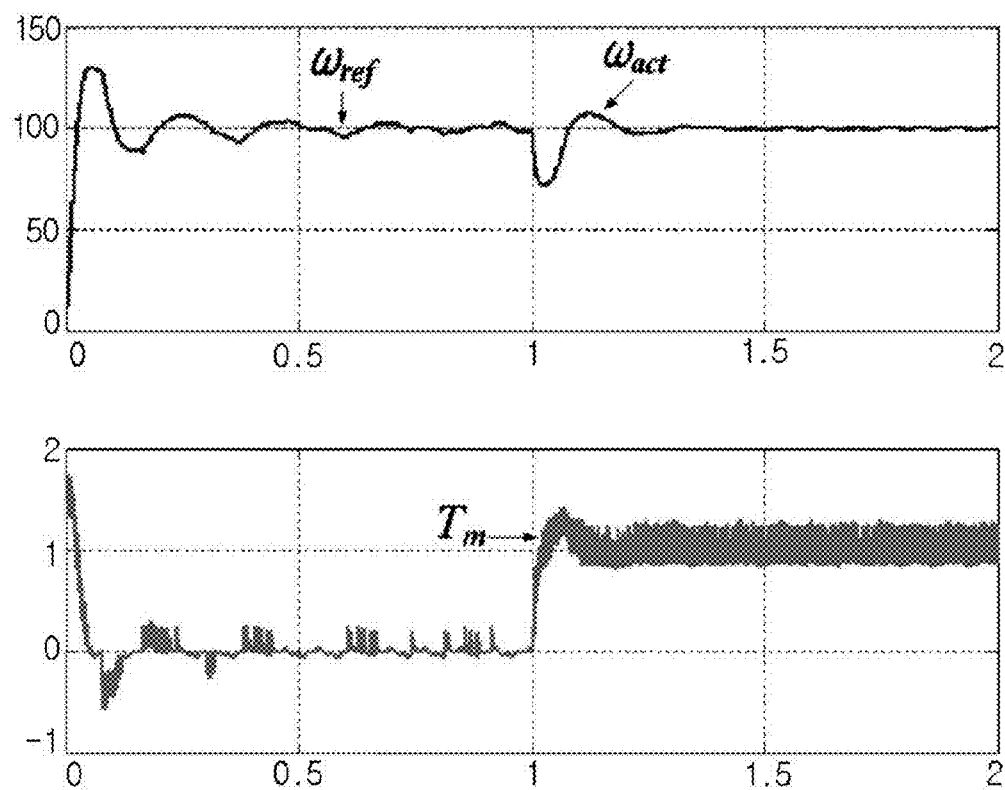
FIGS. 6a and 6b are graphs showing the simulation result of a PID speed controller at 500 [rpm]
Figure 6B:
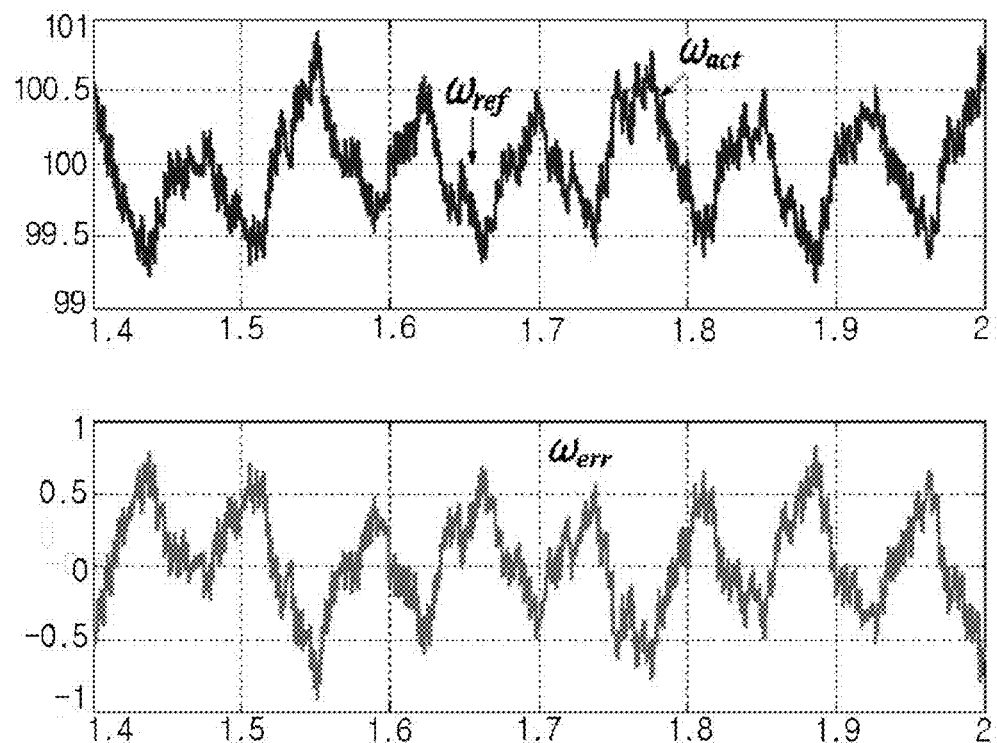
Figure 7A:
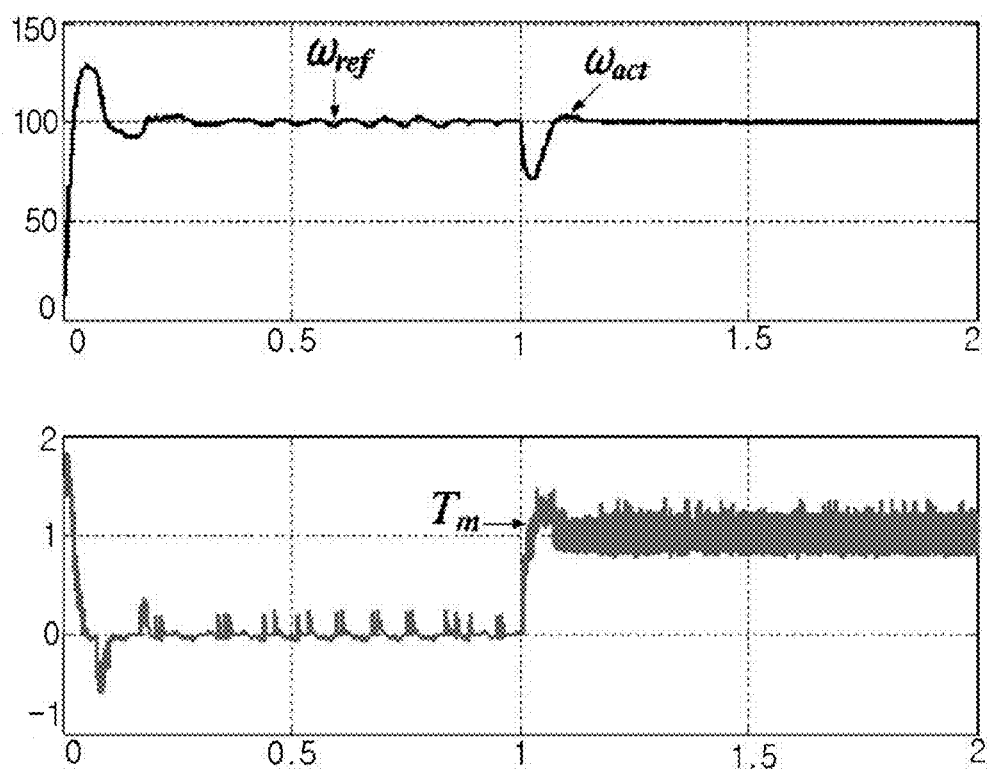
FIGS. 7a and 7b are graphs showing the simulation result of a speed controller having an activation function according to the present invention.
Figure 7B:
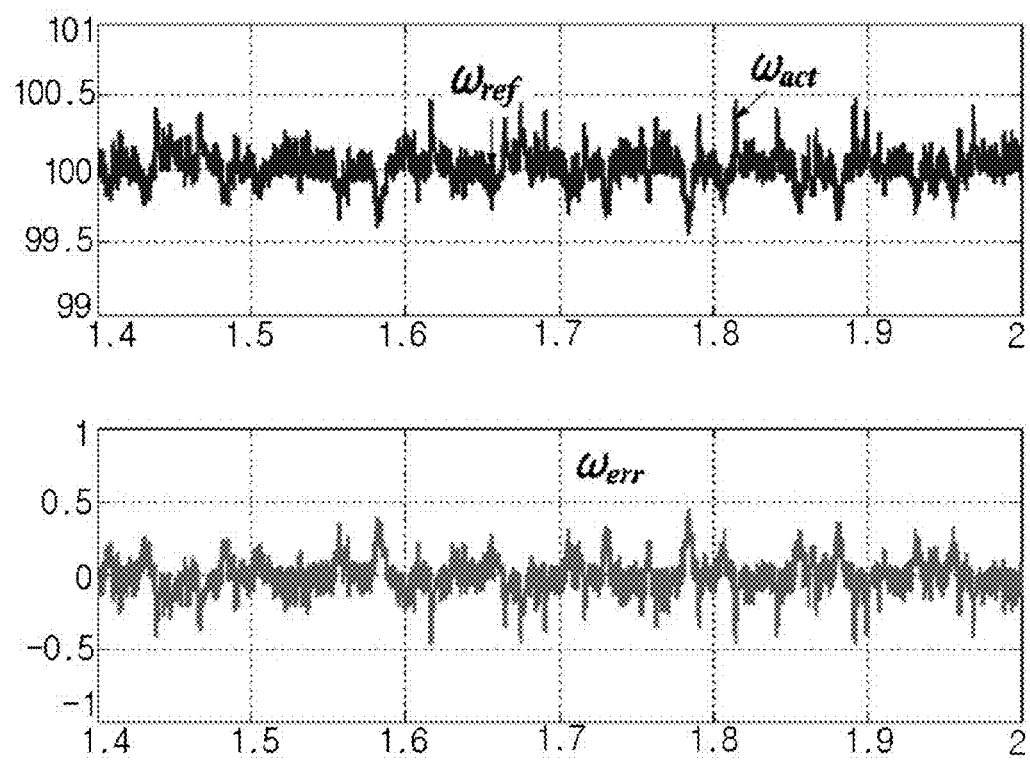

FIGS. 5a and 5b are graphs showing the simulation result of a PI speed controller at 500 [rpm], FIGS. 6a and 6b are graphs showing the simulation result of a PID speed controller at 500 [rpm], and FIGS. 7a and 7b are graphs showing the simulation result of a speed controller having an activation function according to the present invention.

Figure 8A:
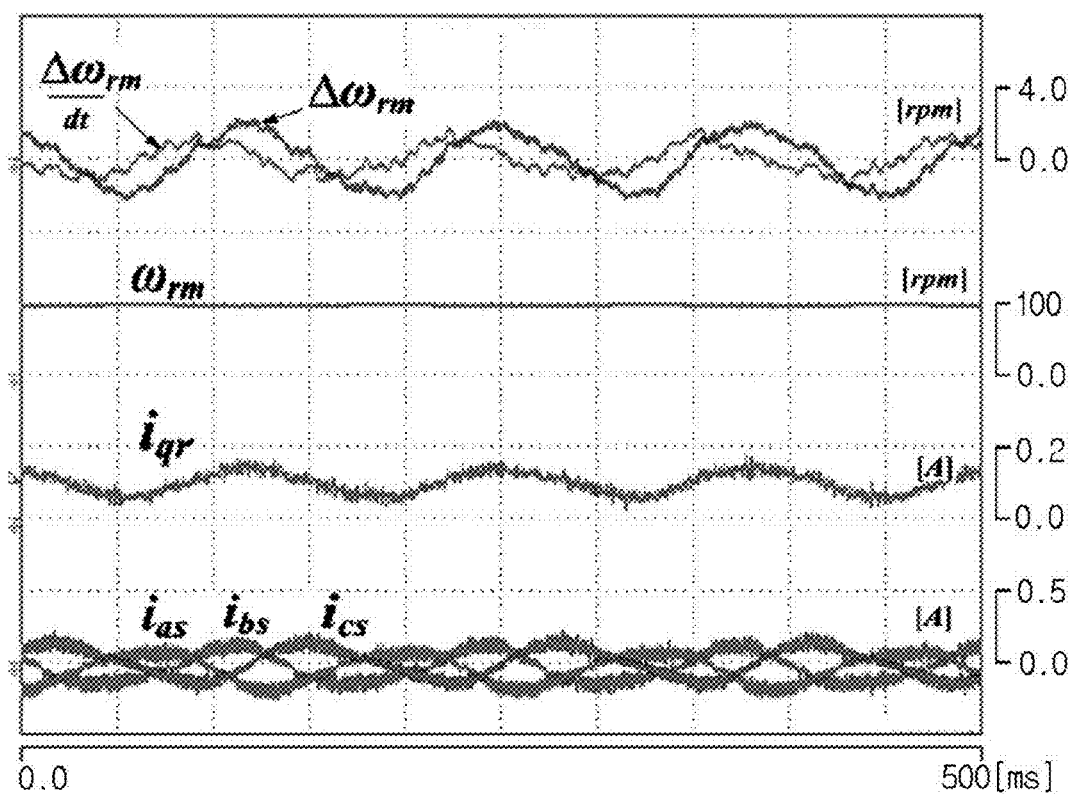
FIG. 8a is a graph showing an experimental result of a PI speed controller upon reversible rotation of 100 [rpm]
Figure 8B:
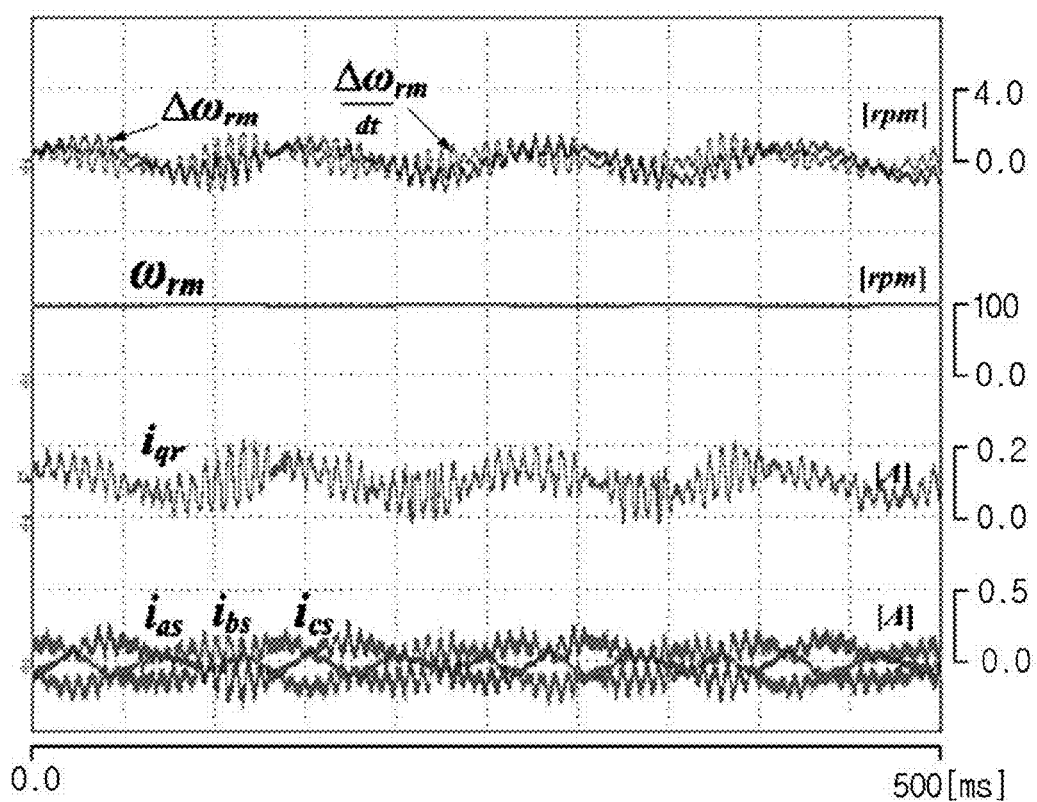
FIG. 8b is a graph showing an experimental result of a PID speed controller upon reversible rotation of 100 [rpm]
Figure 8C:
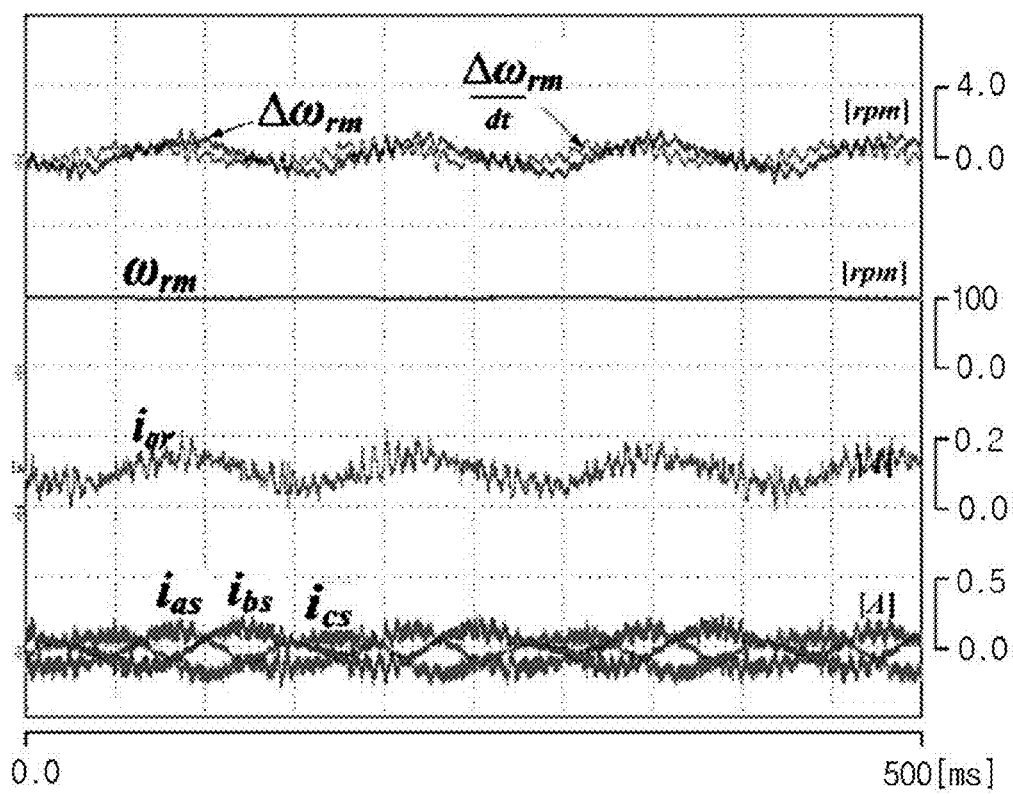
FIG. 8c is a graph showing an experimental result of a speed controller having an activation function of the present invention upon reversible rotation of 100 [rpm]

In addition, FIG. 8a is a graph showing an experimental result of a PI speed controller upon reversible rotation of 100 [rpm], FIG. 8b is a graph showing an experimental result of a PID speed controller upon reversible rotation of 100 [rpm] and FIG. 8c is a graph showing an experimental result of a speed controller having an activation function of the present invention upon reversible rotation of 100 [rpm].

Figure 9A:
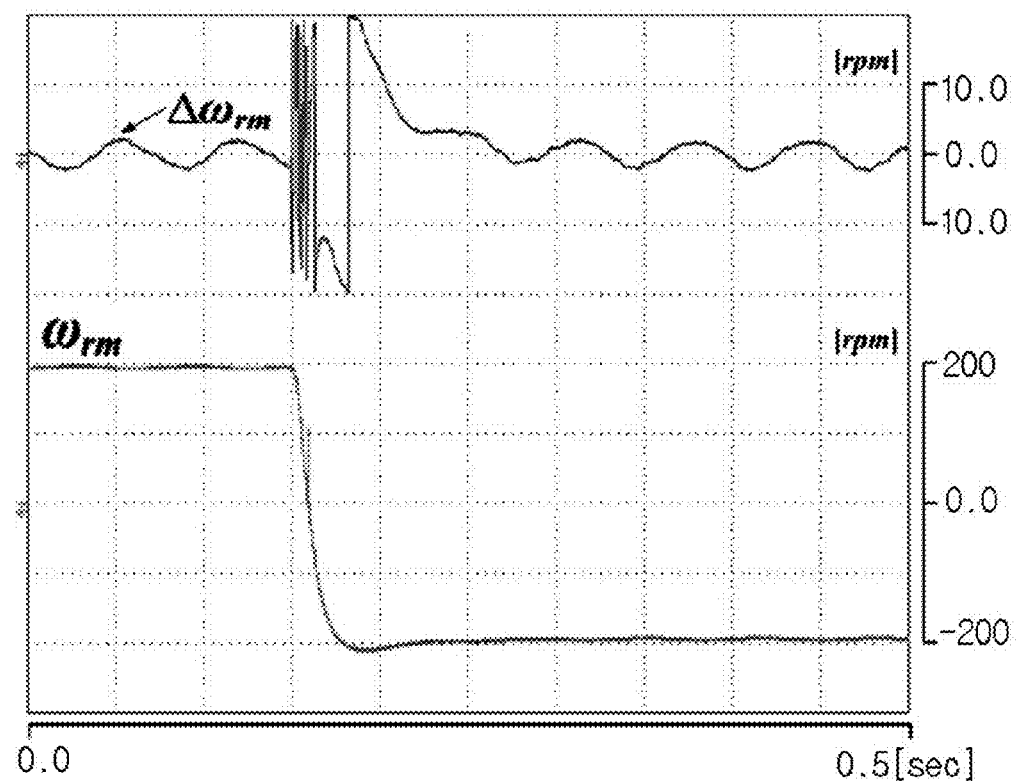
FIG. 9a is a graph showing an experimental result of a PI speed controller upon reversible rotation of 200 [rpm]
Figure 9B:
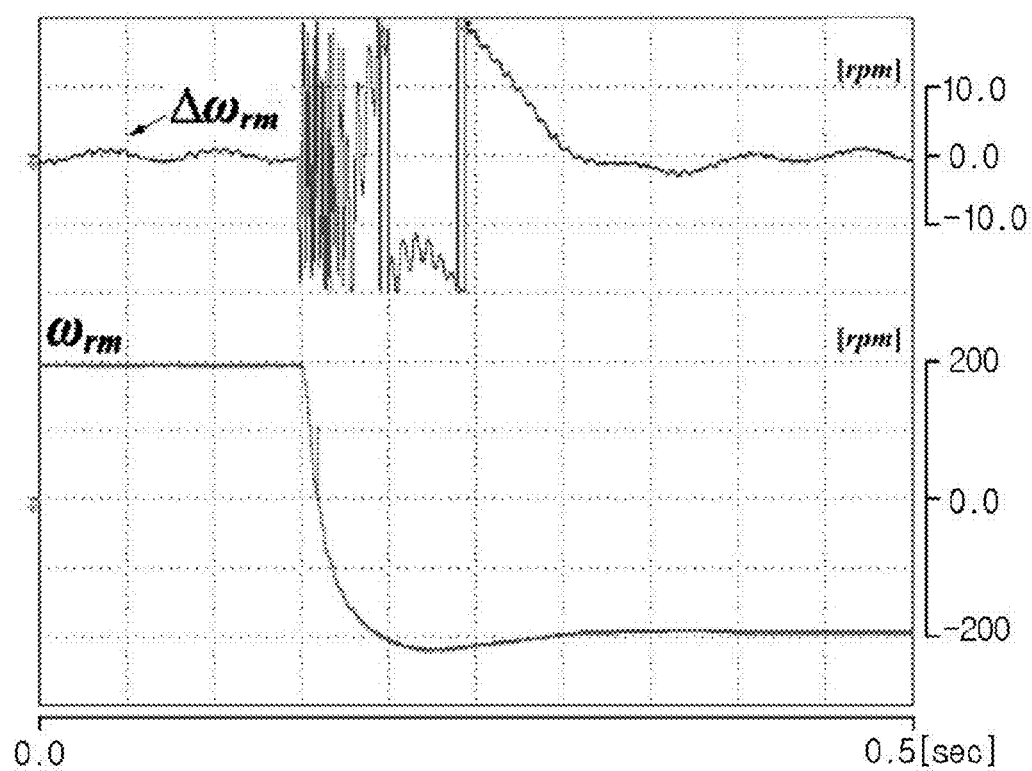
FIG. 9b is a graph showing an experimental result of a PID speed controller upon reversible rotation of 200 [rpm]
Figure 9C:
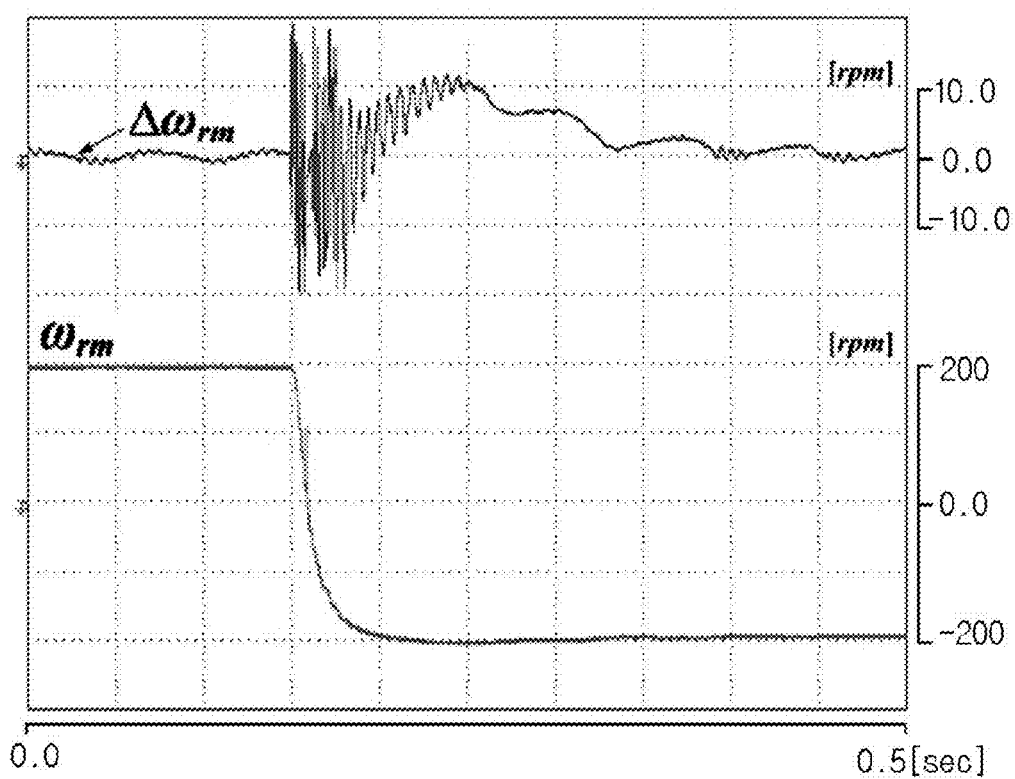
FIG. 9c is a graph showing an experimental result of a speed controller having an activation function of the present invention upon reversible rotation of 200 [rpm]

Further, FIG. 9a is a graph showing an experimental result of a PI speed controller upon reversible rotation of 200 [rpm], FIG. 9b is a graph showing an experimental result of a PID speed controller upon reversible rotation of 200 [rpm], and FIG. 9c is a graph showing an experimental result of a speed controller having an activation function of the present invention upon reversible rotation of 200 [rpm].

Figure 10A:
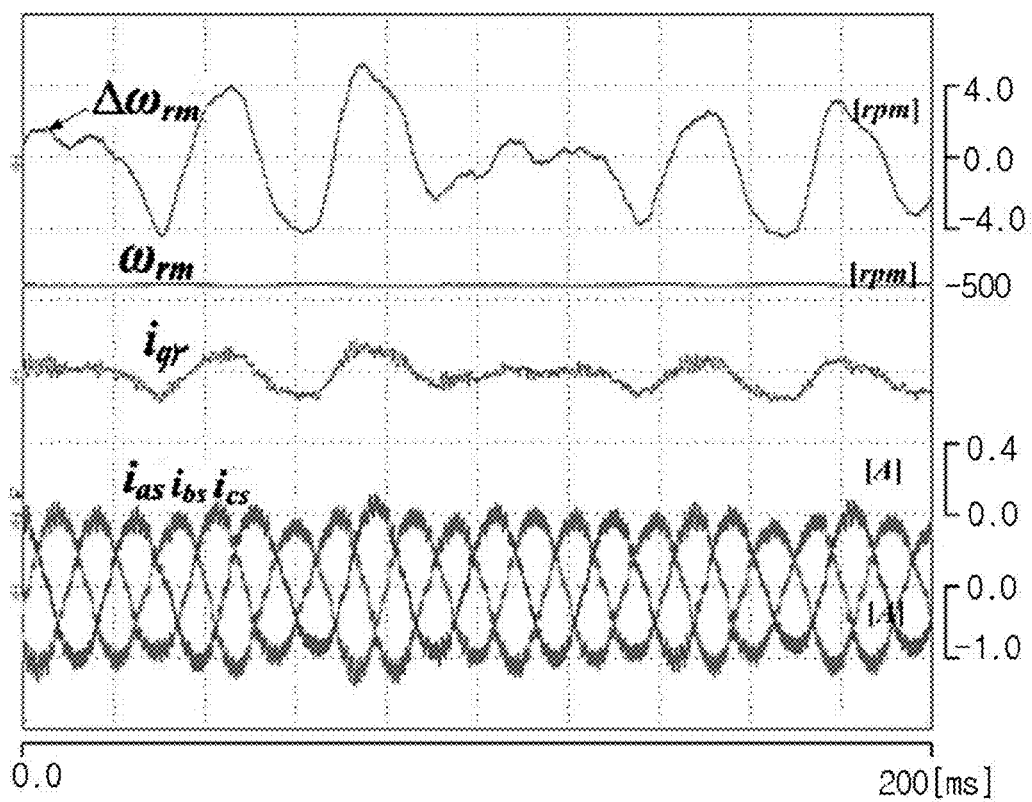
FIG. 10a is a graph showing an experimental result of a PI speed controller upon reversible rotation of 500 [rpm]
Figure 10B:
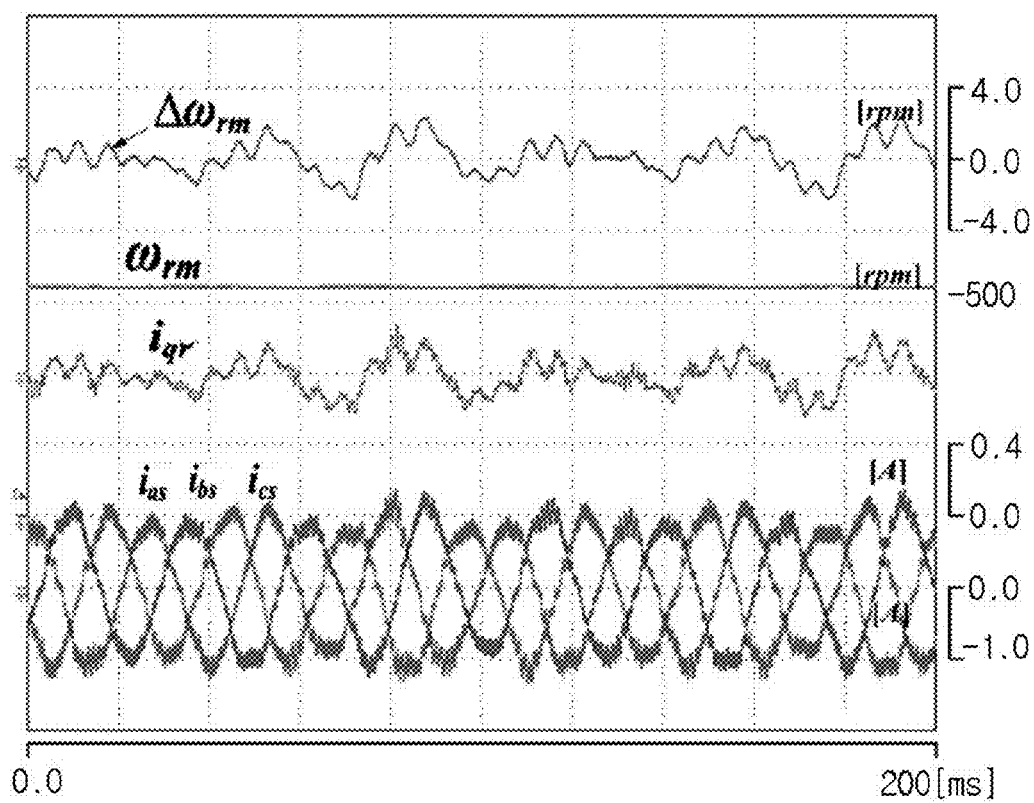
FIG. 10b is a graph showing an experimental result of a PID speed controller upon reversible rotation of 500 [rpm]
Figure 10C:
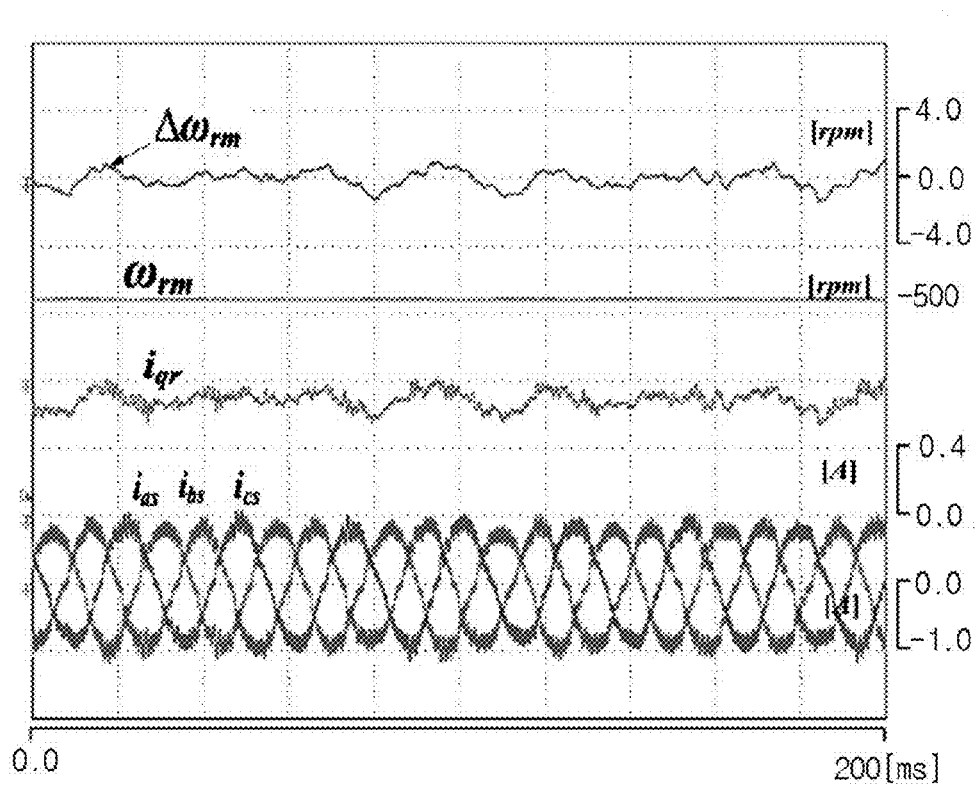
FIG. 10c is a graph showing an experimental result of a speed controller having an activation function of the present invention upon reversible rotation of 500 [rpm].

In addition, FIG. 10a is a graph showing an experimental result of a PI speed controller upon reversible rotation of 500 [rpm], FIG. 10b is a graph showing an experimental result of a PID speed controller upon reversible rotation of 500 [rpm], and FIG. 10c is a graph showing an experimental result of a speed controller having an activation function of the present invention upon reversible rotation of 500 [rpm].

As can be understood from FIGS. 7 to 10, the load current has the sine wave and the speed ripple can be suppressed when the intensity and the direction of the compensated torque is taken into consideration based on the speed error $\omega_{err}$, and the integrated speed error.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

The speed controller having the activation function for suppressing the speed ripple according to the present invention can be employed in the control system for the motor.

What is claimed is:

1. A method for suppressing a speed ripple occurring during an operation of an AC motor by using a torque compensator based on an activation function, the method comprising:
   (a) calculating a speed error $\omega_{err}$ based on a reference speed $\omega_{ref}$ and an actual speed $\omega_{act}$;
   (b) calculating a controller output $T_{rm}$ by using the speed error $\omega_{err}$ as an input of a PI control and an operation of a compensated torque $T_{com}$; and
   (c) determining a torque variation based on the controller output $T_{rm}$ and a reference torque $T_{ref}$ and operating the torque variation in relation to an anti-windup gain $K_a$ to use the torque variation as an input of an integral (I) control, wherein in step (b), an output of the compensated torque $T_{com}$ is determined based on $$f\left(\omega_{err} \cdot \frac{d\omega_{err}}{dt}\right) = 0 \; \left(\text{when,} \; \left(\omega_{err} \cdot \frac{d\omega_{err}}{dt}\right) < 0\right) \text{ and}$$

$$f\left(\omega_{err} \cdot \frac{d\omega_{err}}{dt}\right) = 1 \; \left(\text{when,} \; \left(\omega_{err} \cdot \frac{d\omega_{err}}{dt}\right) > 0\right).$$

2. The method of claim 1, wherein, in step (b), the compensated torque $T_{com}$ is determined based on
   $T_{com} = f(\chi) \cdot K_c \cdot \omega_{err}$, in which $K_c$ is a compensator gain.

3. The method of claim 1, wherein, in step (c), an output of the compensated torque is determined based on a sign of the speed error and a sign of a differential speed error.

* * * * *